United States Patent [19]

Krappmann et al.

[11] 4,328,099
[45] May 4, 1982

[54] MULTI-DISK ROTARY FILTER

[75] Inventors: Franz Krappmann, Grünwald; Bernhard Richter, Puchheim; Siegfried Paruse, Pentenried, all of Fed. Rep. of Germany

[73] Assignee: Krauss-Maffei Aktiengesellschaft, Munich, Fed. Rep. of Germany

[21] Appl. No.: 232,185

[22] Filed: Feb. 6, 1981

[30] Foreign Application Priority Data

Feb. 8, 1980 [DE] Fed. Rep. of Germany ....... 3004707

[51] Int. Cl.³ ............................................. B01D 33/38
[52] U.S. Cl. ................................... 210/232; 210/330
[58] Field of Search ........................ 210/232, 330, 331

[56] References Cited

U.S. PATENT DOCUMENTS 3,064,817 11/1962 Vander Weaff .................... 210/232
4,193,875 3/1980 Stahl et al. ......................... 210/330

Primary Examiner—John Adee
Attorney, Agent, or Firm—Karl F. Ross

[57] ABSTRACT

A rotary filter of the type described in U.S. Pat. No. 4,193,875 in which each of the filter disks, axially spaced on the rotating shaft, is subdivided into a plurality of sections or cells and each of the sections is connected by a tube to a fluid distributor or control head for evacuation, pressurization or the like. According to the invention, each of the passages connecting each section with the control head is formed by a unitary tube having an axially extending section, a bend and a radial section connected by the bend to the axial section. In the control head a disk fixed to the hollow shaft is provided in which the ends of the axial sections terminate removably and sealingly. The radial sections are fixed to the filter-segment carriers, e.g. by flanges and screws or bolts through these flanges.

6 Claims, 3 Drawing Figures

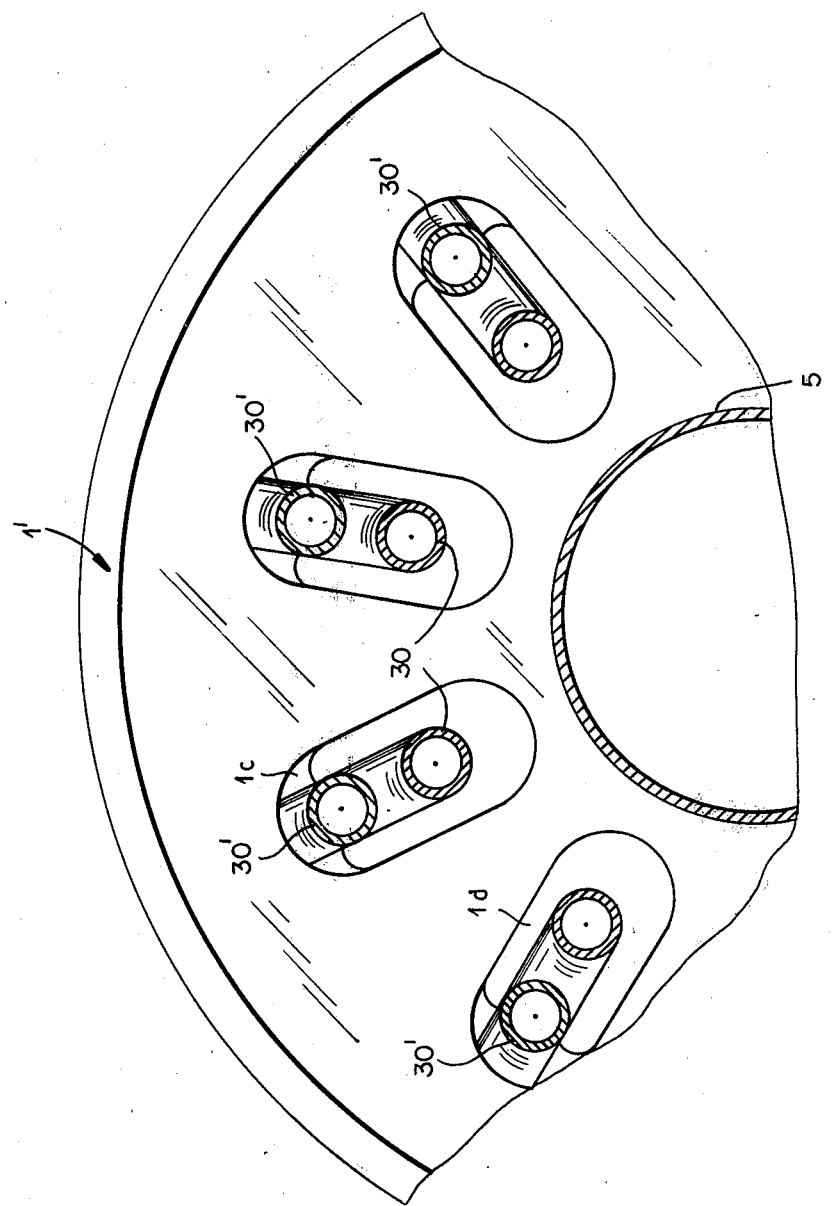

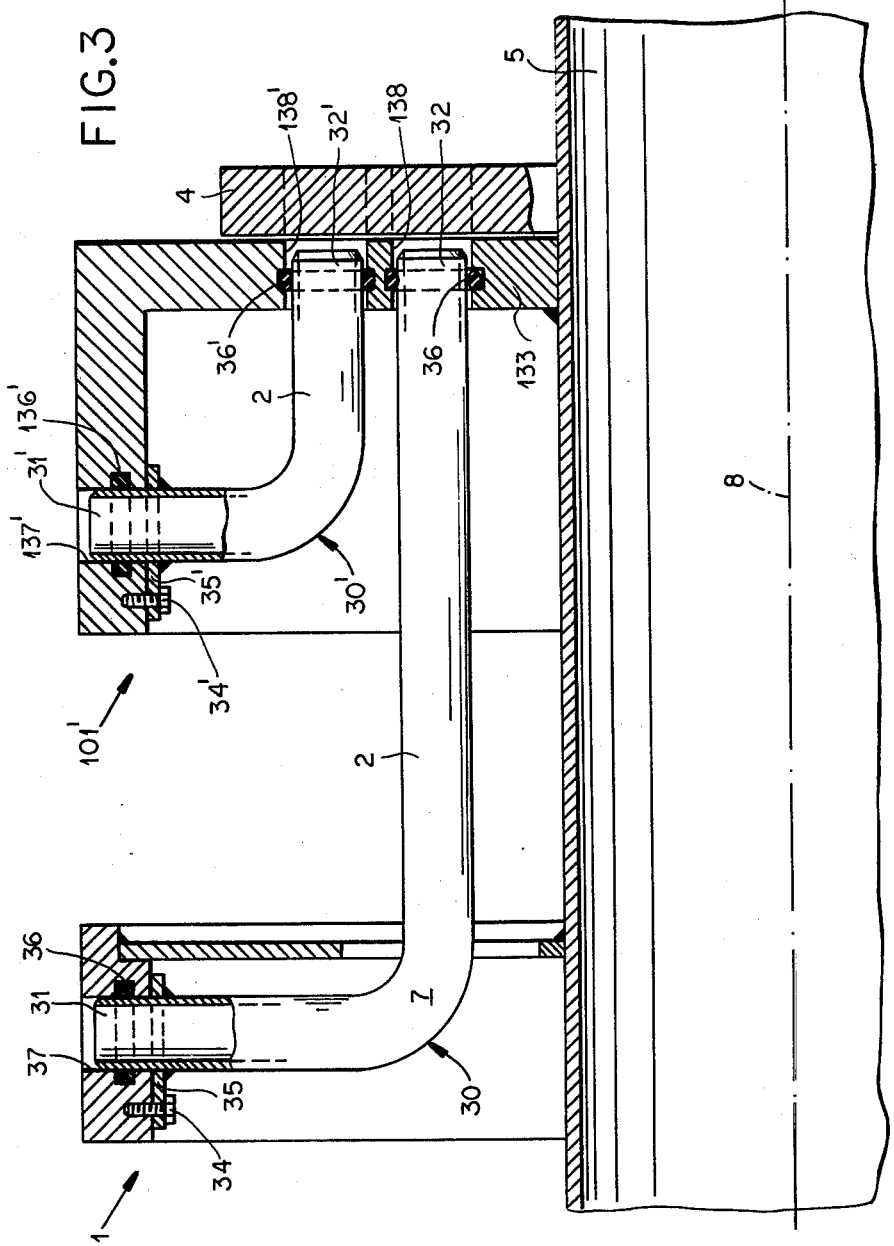

MULTI-DISK ROTARY FILTER

FIELD OF THE INVENTION

Our present invention relates to multi-disk rotary filters and, more particularly, to improvements in the fluid connection between segments of the disks of such filters and a control head or distributor.

BACKGROUND OF THE INVENTION

U.S. Pat. No. 4,193,875, commonly assigned with the present case, the literature cited therein and pages 270ff. of *Filtration and Separation*, May/June 1974, describe modern multi-disk rotary filters in which a horizontal shaft is rotatable relative to a housing or trough into which a slurry or suspension to be filtered can be fed, the shaft carrying a plurality of axially spaced filter disks lying in respective vertical planes and subdivided into a multiplicity of filter sections or cells which successively are immersed in the suspension in the trough and from which filtrate can be evacuated or withdrawn to allow filter cakes to collect on the filter cloth or other filtering surface of the disk.

The filter cakes may be washed, drained from liquid and dislodged by evacuation of fluid from or the supply of fluid to the respective filter cells via fluid passages communicating between these cells and a distributing head or control or valving member at an end of the shaft.

The filter disks each comprise a cell carrier which may be fixed to the hollow shaft and which can be formed with a plurality of angularly equispaced radial openings, each communicating with a respective filter cell and with which the aforementioned passages communicate in turn.

In the aforementioned patent, the passages are disposed outwardly of the shaft and are fixed thereto while having axially extending sections parallel to the shaft axis and or curved sections which run into radial sections or open radially in the filter cell carriers.

When the filter is used continuously for long periods in corrosive or abrasive media, the passage-forming members must be replaced from time to time. While the arrangement disclosed in the aforementioned patent represents a vast improvement over earlier systems, nevertheless the replacement of the passage-forming members has frequently necessitated replacement of the filter cell carriers as well, a complex and time-consuming procedure which requires a comparatively long interruption in the operation of the filter.

OBJECTS OF THE INVENTION

It is the principal object of the present invention to provide an improved multi-disk rotary filter of the type described which is free from the aforementioned disadvantages and in which replacement of the passage-forming members is facilitated.

Another object of our invention is to provide an improved system for connecting the filter cells of a multi-disk rotary filter with the control or distributing head.

Still another object of the invention is to provide a low-cost, simple and rapid system for facilitating replacement of the fluid passages of a multi-disk rotary filter of the class described.

SUMMARY OF THE INVENTION

These objects and others which will become apparent hereinafter are attained in a filter of the aforementioned type wherein the filtrate or, more generally, the fluid passages are formed from unitary (one-piece) tubular elements each of which has a straight axially extending section, a bend or elbow section at one end of the straight section and a radial portion extending from the elbow and anchored in the respective cell carrier, the straight portion having, in turn, an end which is sealingly releasably received in a disk fixed to the hollow shaft and cooperating with the distributor or control head.

The radial end is detachable from the filter carrier as well so that the entire tube, including the radial, bent and straight portions, can be removed and replaced in the event of wear, inexpensively and rapidly.

According to a feature of the invention, the shaft-fixed disk cooperating with the distributor can be formed unitarily with the filter cell carrier proximal to the distributor.

In addition, or independently, each of the tubes can be formed at its radial portion with an outwardly extending flange which can be traversed by one or more screws for connecting it to the filter cell carrier, this flange being set back from the tube extremity to allow this extremity to engage in a bore of the filter cell carrier and to cooperate with an O-ring recessed therein.

At the opposite end of the tube, the latter also is engaged by, on O-ring set into the wall of a bore in the aforementioned disk. Of course, the disk may also be independent and axially spaced from the filter cell carrier proximal to the distributor or control head.

BRIEF DESCRIPTION OF THE DRAWING

The above and other objects, features and advantages of the present invention will become more readily apparent from the following description, reference being made to the accompanying drawing in which:

FIG. 2 is a cross-sectional view taken along the line II—II of FIG. 1; and

FIG. 3 is a view similar to FIG. 1 but illustrating another embodiment of the invention.

SPECIFIC DESCRIPTION

Figure 1:
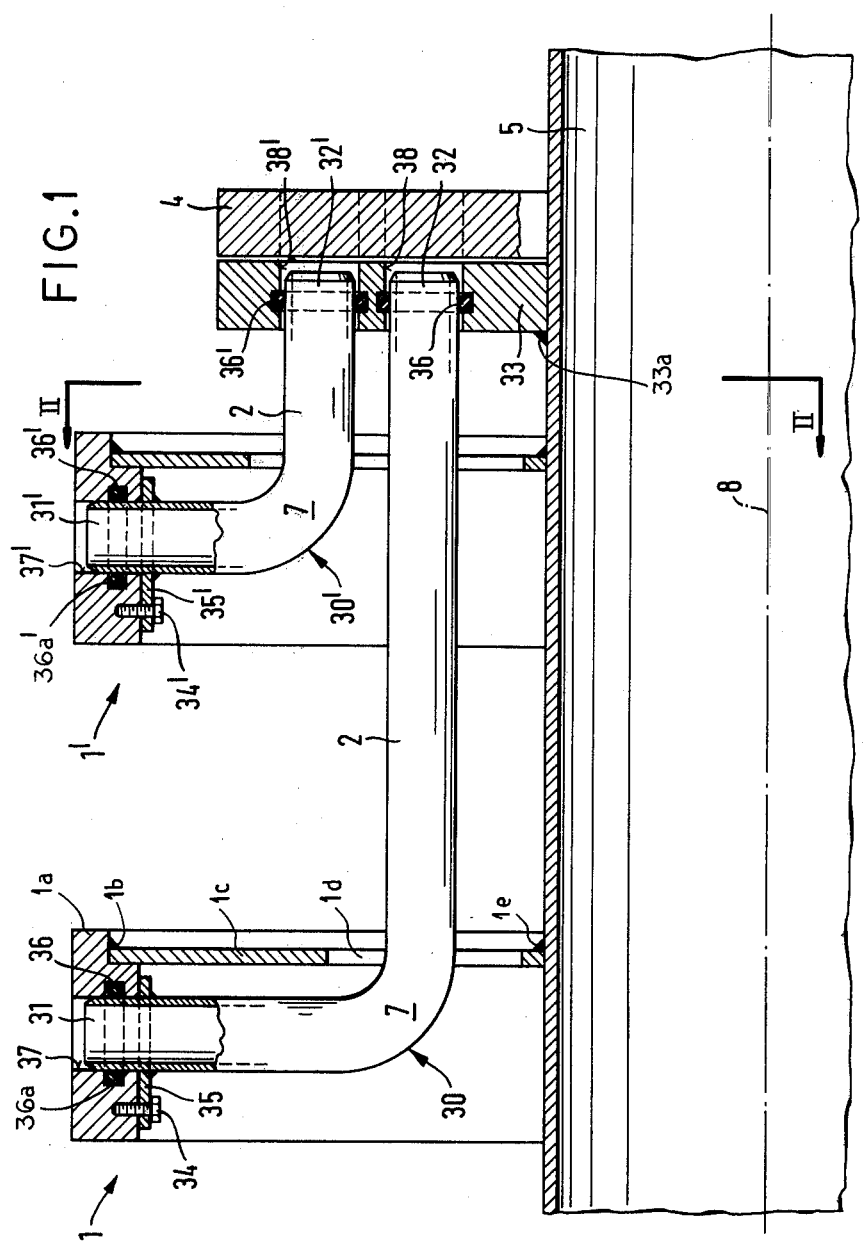
FIG. 1 is an axial cross-sectional view of a portion of a multi-disk filter showing two filter carriers and part of the distributor head.

The multi-disk filter 1, apart from the unique passage construction described below, can be operated and constructed as described in the *Filtration and Separation* article mentioned previously, comprises a hollow shaft 5 rotatable about a horizontal axis 8 and a plurality of filter cell carriers of which two have been shown at 1 and 1'. Each of these carriers can comprise a cylindrical hub 1a welded at 1b to a disk 1c provided with slots 1d and welded in turn at 1e to the shaft 5.

In addition, the shaft 5 carries a control or distributing disk 33 which is welded to the shaft 5 at 33a and cooperates with the fluid distribution head represented by a control disk 4 with respect to which the shaft 5 is rotatable.

The cell carriers 1 and 1', each of which supports a filter disk with a multiplicity of segmental filter cells, e.g. 30, are each formed with a corresponding number of radial bores 37 and 37' communicating with the respective filter cells and connecting via unitary tubes 20 and 30', forming the fluid passages mentioned previously, with the axial bores 38 and 38' of the disk 33.

The radially directed extremities 31 and 31' of the tubes 30 and 30' forming the passages 2, are each received snugly in the respective bores 37 and 37' and sealingly cooperate with O-rings 36 and 36' received in grooves 36a and 36a' formed in the walls of the bores 37 and 37'.

Rearwardly of these extremities, the radially directed portions of the tubes are provided with transverse flanges 34 and 34' to the cell carriers 1 and 1' so that removal of these screws allows the radial extremities of the tubes to be withdrawn from the bores 37 and 37'.

The releasable and removable connection of the axially directed ends 32 and 32' of the tubes 30 and 30' is formed by permitting these ends to be fitted simply into O-ring seals 36 and 36' of the bores 38 and 38' of disk 33.

In the event of wear requiring a replacement of the filtrate or, more generally, the fluid passages, the release of the screw connections is effected and the ends of the tubes are withdrawn from the respective bores. Replacement is effected in the opposite sense. A pivotal movement with respect to the axis 8 enables withdrawal of the worn tubes and insertion of the new tubes.

The single-piece tubes having the curved or elbow portions 7 between axially extending straight portions and radial portions are simple and inexpensive.

Instead of screw connections as shown, a nut surrounding the radial end of each tube can draw a flange thereof against the cell carrier 1 or 1'.

In FIG. 3 we have shown a correspondingly functioning system wherein, however, the disk 133 is formed unitarily with the filter cell carrier 101' which is provided with the bores 137' and seals 136'. In this case, the bores 138 and 138' are thus also formed in the disk portion of the filter cell carrier 101' proximal to the distributor disk 4.

We claim:

1. In a multi-disk rotary filter comprising a shaft rotatable about an axis, a plurality of cell carriers axially spaced on said shaft, connected thereto for rotation with said shaft, and a control head for the control of fluid supplied to and drawn from filter cells on each cell carrier, and fluid passages connecting each cell carrier with said head, the improvement wherein each of said passages comprises a unitary tube having a radial portion communicating with a respective cell at a respective carrier, an elbow connected to said radial portion, and an axially extending straight portion connecting said cell with said head, said shaft being provided with a disk cooperating with said head and at which the straight portions of said tubes sealingly and releasably terminate.

2. The improvement defined in claim 1 wherein said disk is connected to a filter cell carrier proximal to said head.

3. The improvement defined in claim 1 wherein said disk is separate from and axially spaced from the carrier proximal to said head.

4. The improvement defined in claim 1, claim 2 or claim 3 wherein said radial portions of said tubes are each formed with a flange connected by a screw to the respective cell carrier.

5. The improvement defined in claim 1, claim 2 or claim 3, further comprising O-ring seals sealing each end of each tube to a respective carrier and to said disk, respectively.

6. The improvement defined in claim 1 wherein each carrier is provided with a plurality of radial bores each communicating with a respective filter cell and formed with an inwardly open groove receiving an O-ring, each radial portion of each tube being received in a corresponding one of said bores and being sealingly engaged by the respective O-ring, said disk being formed with axial bores each receiving an axially extending end of a straight portion of a respective tube and receiving an O-ring sealingly engaging same, each of said tubes being removably affixed to the respective carrier by a screw-threaded element.

* * * * *